United States Patent
Ji

(10) Patent No.: US 8,241,818 B2
(45) Date of Patent: Aug. 14, 2012

(54) DIFFUSION MEDIA WITH HYDROPHOBIC AND HYDROPHILIC PROPERTIES

(75) Inventor: Chunxin Ji, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2531 days.

(21) Appl. No.: 10/913,860

(22) Filed: Aug. 6, 2004

(65) Prior Publication Data

US 2006/0029858 A1     Feb. 9, 2006

(51) Int. Cl.
*H01M 4/02* (2006.01)
(52) U.S. Cl. .................. 429/534; 429/523; 429/512
(58) Field of Classification Search .............. 429/534, 429/523, 512
See application file for complete search history.

(56) References Cited

U.S. PATENT DOCUMENTS

| | | | |
|---|---|---|---|
| 4,038,463 A | 7/1977 | Lamarine et al. | |
| 4,931,168 A | 6/1990 | Watanabe et al. | |
| 5,641,586 A * | 6/1997 | Wilson | 429/30 |
| 5,998,058 A | 12/1999 | Fredley | |
| 5,998,098 A | 12/1999 | Kraska | 430/309 |
| 6,083,638 A | 7/2000 | Taniguchi et al. | |
| 6,365,293 B1 * | 4/2002 | Isono et al. | 429/34 |

FOREIGN PATENT DOCUMENTS

EP     0 846 347 B1     6/2000

OTHER PUBLICATIONS

"Control of carbon fiber—polypyrrole interphases by aqueous electrochemical process", Jude O. Iroh et al., Composites Part B 29B, Elsevier Science Limited, Great Britain, 1998, pp. 181-188.

\* cited by examiner

*Primary Examiner* — Barbara Gilliam
*Assistant Examiner* — Zachary Best
(74) *Attorney, Agent, or Firm* — Harness, Dickey & Pierce, P.L.C.

(57) ABSTRACT

A diffusion medium for use in a PEM fuel cell contains hydrophobic and hydrophilic areas for improved water management. A hydrophobic polymer such as a fluororesin is deposited on the paper to define the hydrophobic areas, and an electroconductive polymer such as polyaniline or polypyrrole is deposited on the papers defining the hydrophilic areas. In various embodiments, a matrix of hydrophobic and hydrophilic areas on the carbon fiber based diffusion media is created by electropolymerization of a hydrophilic polymer onto a diffusion medium which has been previously coated with a hydrophobic polymer such as a fluorocarbon polymer. When an aqueous solution containing monomers for electropolymerization is contacted with a fluorocarbon coated diffusion medium, the hydrophilic polymer will be preferentially deposited on areas of the carbon fiber based diffusion medium that are not covered by the fluorocarbons.

15 Claims, 3 Drawing Sheets

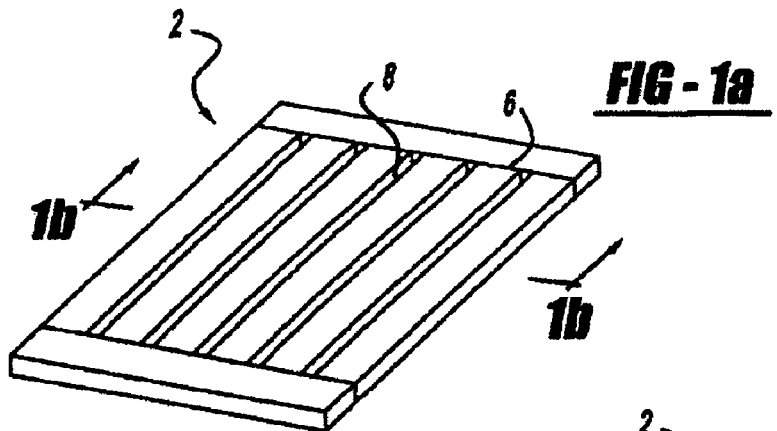
*FIG - 1a*
*FIG - 1b*
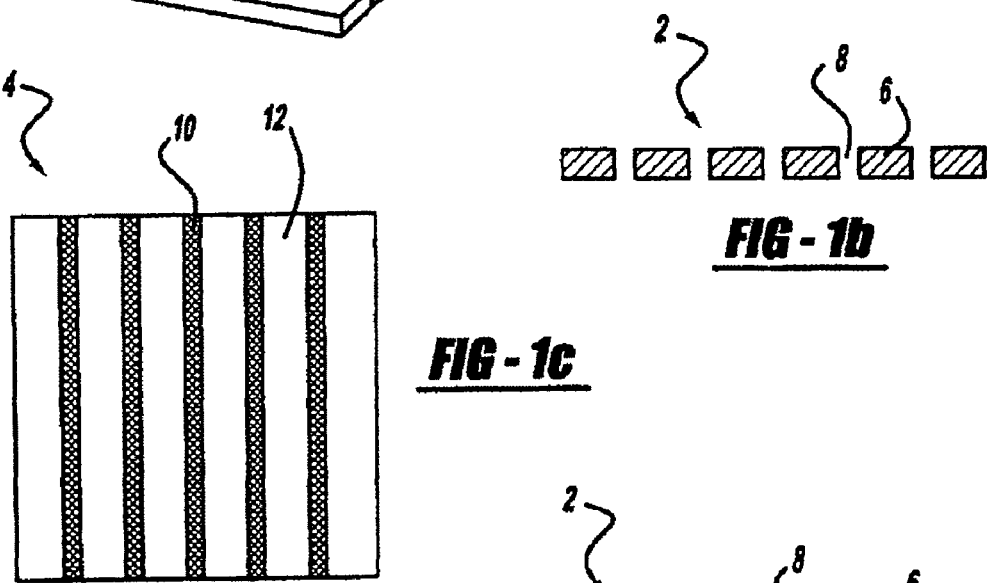
*FIG - 1c*
*FIG - 2a*
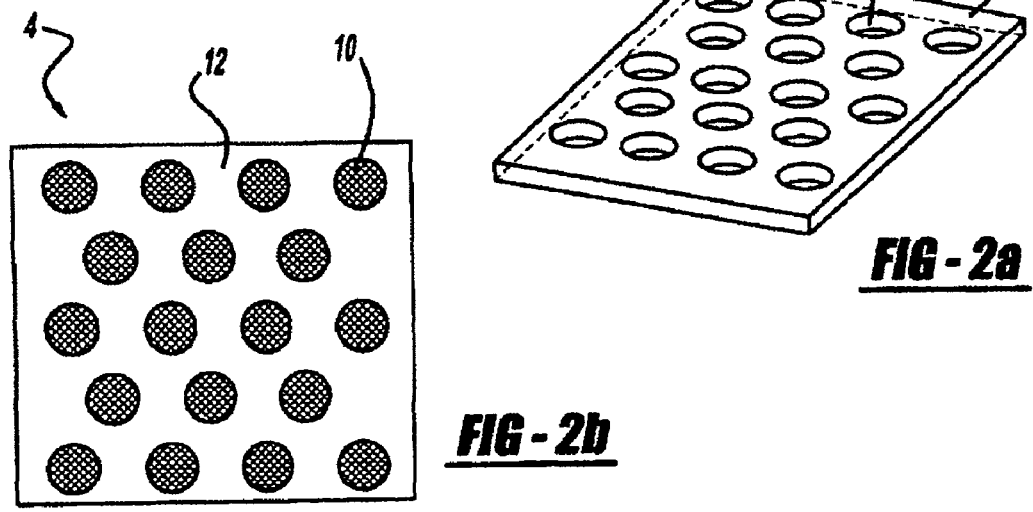
*FIG - 2b*

DIFFUSION MEDIA WITH HYDROPHOBIC AND HYDROPHILIC PROPERTIES

FIELD OF THE INVENTION

This invention relates to fuel cells and methods for improving water management during operation of the fuel cells. It further relates to methods for preparing diffusion media for the fuel cells that have spatial patterned hydrophobic and hydrophilic regions.

BACKGROUND OF THE INVENTION

Fuel cells are increasingly being used as power sources for electric vehicles and other applications. An exemplary fuel cell has a membrane electrode assembly (MEA) with catalytic electrodes and a proton exchange membrane formed between the electrodes. During operation of the fuel cell, water is generated at the cathode electrode based on electrode chemical reactions between hydrogen and oxygen occurring within the MEA. Efficient operation of a fuel cell depends on the ability to provide effective water management in the system.

Gas diffusion media plays an important role in PEM fuel cells. In general, diffusion media need to wick product water away from the cathode catalyst layer while maintaining reactant gas flow from the gas flow channels through to the catalyst layer. In addition, the proton exchange membrane between the electrodes works best when it is fully hydrated. Accordingly, one of the most important functions of the gas diffusion media is to provide water management during fuel cell operation.

For best water management, it is desirable to provide a gas diffusion medium having a desirable balance of hydrophilic and hydrophobic properties. By providing gas diffusion media with a proper balance of hydrophilic and hydrophobic properties, it is possible to provide different transportation paths for reactant gases and product water and thus prevent flooding in the cell due to excessive accumulation of water in the pores of the gas diffusion media while maintaining proper hydration of the proton exchange membrane, especially from the anode side when water is carried into the cathode side by proton through osmotic drag at high current density. In addition, it will enable utilizing fairly dry inlet reactant gas by maintaining decent amount of liquid water in the gas diffusion media or by in-cell liquid water recycling and thus reduces the capacity requirement for the external humidifier.

It is common in fuel cell technology to add polytetrafluoroethylene (PTFE) to carbon fiber diffusion media. Such addition makes the media more hydrophobic and provides advantages. Various attempts have been made to improve the water management ability of the PTFE coated media, including the coating of an additional microporous layer and/or embedding of wicking materials into the diffusion media.

Accordingly, it would be desirable to provide gas diffusion media having improved balance of hydrophobic and hydrophilic properties that could be exploited to provide efficient water management in fuel cells. It would further be desirable to provide methods of depositing hydrophobic materials such as polytetrafluoroethylene onto such diffusion media such that the hydrophobic and hydrophilic regions can be precisely positioned in order to obtain optimum fuel cell efficiency.

SUMMARY OF THE INVENTION

In one embodiment, a diffusion medium for use in a PEM fuel cell contains hydrophobic and hydrophilic areas for improved water management. The diffusion medium contains a carbon fiber paper that is in the form of a sheet having two sides. A hydrophobic polymer is deposited on the paper to define the hydrophobic areas, and a hydrophilic electroconductive polymer is deposited on the papers, defining the hydrophilic areas. In various embodiments, a matrix of hydrophobic and hydrophilic areas on the carbon fiber based diffusion media is created by electropolymerization of the hydrophilic polymer onto a diffusion medium which has been previously coated with a hydrophobic polymer such as a fluorocarbon polymer. When an aqueous solution containing monomers for electropolymerization is contacted with a fluorocarbon coated diffusion medium, the hydrophilic electroconductive polymer will be preferentially deposited on areas of the carbon fiber based diffusion medium that are not covered by the fluorocarbons. Since the electropolymerization occurs predominantly on areas not covered by the fluorocarbon, a diffusion medium with a balance of hydrophobic areas and hydrophilic areas will be produced.

In another embodiment, PEM fuel cells are provided that contain the diffusion medium disposed in a fluid distribution chamber defined on the cathode side and anode side of the cell by an impermeable electrically conductive member such as a bipolar plate. The balance of hydrophilic and hydrophobic areas on the diffusion medium may be tailored to provide a desired level of water management in the fuel cell. For example, in various embodiments, the fluid distribution chamber has a reactant gas entrance side and an exit side. An oxidizer gas such as oxygen is provided to the cathode entrance. Hydrogen fuel is provided to the anode entrance. Hydrogen is oxidized at the anode to form proton and proton passes through the polymer exchange membrane from the anode to the cathode to form water by reaction with oxygen gas. The product water is wicked away from the cathode electrode by the action of the diffusion medium and removed from the cell by the flow of oxidizer gas. In one embodiment, the content of hydrophobic polymer on the diffusion medium is greater in an area of the diffusion medium adjacent the exit side than in an area of the diffusion medium adjacent the entrance side. Alternatively, the content of the hydrophilic polymer may be greater in an area of the diffusion medium adjacent the entrance side than in an area adjacent the exit side.

In various embodiments, the hydrophobic polymer comprises a fluorocarbon polymer such as polytetrafluoroethylene (PTFE), and the electrophilic polymer deposited by electropolymerization is polyaniline or polypyrrole. Preferably, the hydrophobic polymer is non-electrically conductive.

In another embodiment, the diffusion media are prepared by a process comprising depositing a fluorocarbon polymer onto a conductive, porous substrate, such as a carbon fiber based substrate in a pattern such that a portion of the substrate is left uncovered with the fluorocarbon polymer. Thereafter, an electroconductive polymer is preferentially deposited by electropolymerization onto the uncovered portion of the substrate. Preferably, the deposited fluorocarbon polymer is subjected to high temperature to sinter the polymer, burn away the dispersion agent from the fluorocarbon polymer solution and fix it on the carbon fiber based substrate prior to carrying out the electropolymerization step.

Further areas of applicability of the present invention will become apparent from the detailed description provided hereinafter. It should be understood that the detailed description and specific examples, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1 and 2 illustrate embodiments of pattern members used to carry out a method to deposit hydrophobic polymer on a substrate in a desired pattern;

DETAILED DESCRIPTION

Figure 3A:
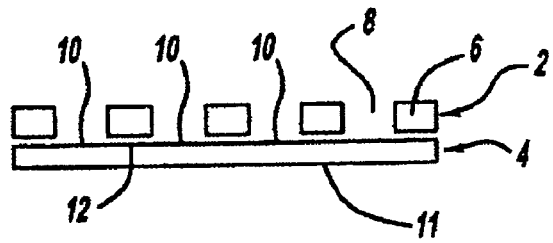
FIGS. 3, 4, and 5 are cross-sectional views of molds used in the method.

The following description of the preferred embodiment(s) is merely exemplary in nature and is in no way intended to limit the invention, its application, or uses.

A diffusion medium for use in a PEM fuel cell containing hydrophobic and hydrophilic areas for improved water management comprises an electrically conductive porous material in the form of a sheet having two sides; a hydrophobic polymer deposited on the porous material defining the hydrophobic areas; and a hydrophilic electroconductive polymer deposited on the porous material, defining the hydrophilic areas. A preferred porous material is a carbon fiber paper or carbon cloth.

In various embodiments, the hydrophobic polymer is a fluorocarbon polymer. Suitable hydrophobic polymers include, without limitation, polytetrafluoroethylene (PTFE), fluorinated ethylene propylene (FEP), and polyfluoroalkoxy (PFA). Preferred electroconductive polymers include, without limitation, polyaniline and polypyrrole. In various embodiments, the hydrophobic areas defined by coatings of hydrophobic polymer are predominantly on one side of the paper, while the hydrophilic areas defined by the deposits of the electroconductive polymer are predominantly on the other side of the paper. In other embodiments, a pattern of hydrophobic and hydrophilic areas is provided on one or both sides of the paper to provide a diffusion medium having a balance of hydrophilic and hydrophobic properties.

In another embodiment, a method of preparing a carbon fiber based diffusion medium having hydrophobic areas and hydrophilic areas comprises: a) depositing a hydrophobic polymer onto a carbon based substrate in a pattern such that a portion of the substrate is left uncovered with the hydrophobic polymer; and thereafter b) depositing an electroconductive polymer onto the uncovered portion of the substrate. In various embodiments, the hydrophobic polymer comprises a fluorocarbon polymer such as PTFE and the electroconductive polymer comprises polyaniline or polypyrrole. In some embodiments, the hydrophobic polymer is deposited predominantly on one side of the substrate, and the electroconductive polymer is deposited predominantly on the other side.

The hydrophobic or fluorocarbon polymer may be deposited onto the carbon fiber based substrate by a variety of methods. In various preferred embodiments, a desired pattern of fluorocarbon polymer may be deposited on the carbon fiber substrate by methods discussed below and in co-pending application entitled "Preparation of Patterned Diffusion Media", commonly assigned to the current Assignee and filed Apr. 14, 2004 as Ser. No. 10/824,032, the disclosure of which is hereby incorporated by reference. In various embodiments, the fluorocarbon polymer is deposited onto the substrate with a process comprising the steps of: a) wetting a sheet of carbon fiber paper with solvent in an aqueous emulsion of fluorocarbon polymer, such as by dipping the paper into the emulsion; b) contacting the wet sheet with a pattern member comprising one or more openings oriented to correspond to a predetermined pattern of fluorocarbon polymer deposition; c) and evaporating the solvent from the sheet while the sheet is in contact with the pattern member. As a result, the fluorocarbon polymer is concentrated on the sheets at the areas adjacent the openings on the pattern member. The contacting step may be carried out by holding the sheet between two mold surfaces wherein at least one mold surface comprises opening through which the solvent can evaporate. In an alternative embodiment, one mold surface comprises openings and the other mold surface is solid. In another embodiment, both mold surfaces comprise openings and a pattern of fluorocarbon polymer is deposited on both sides of the carbon fiber paper. The pattern member may comprise a screen.

In various embodiments, evaporating of the solvent is accomplished by heating the sheet to remove the solvent. In various preferred embodiments, at least one side of the sheet is coated over about 10 to about 90% of its area with fluorocarbon polymer. In other embodiments, at least one side of the sheet is coated over about 10 to about 60% of its area with fluorocarbon polymer.

In various embodiments, the electroconductive polymer may be deposited as described below and in co-pending application entitled "Increasing the Hydrophilicity of Carbon Fiber Paper by Electropolymerization", Ser. No. 10/912396 commonly assigned to the current Assignee and filed on Aug. 5, 2004, the disclosure of which is hereby incorporated by reference. Preferably, the electroconductive polymer is deposited from an aqueous solution of a polymerizing monomer by electrochemical polymerization. Preferably the solution contains an electrolyte and a monomer selected from the group consisting of pyrrole, thiophene, aniline, furan, azulene, carbazole, and derivatives thereof. Electropolymerization is accomplished by setting up the carbon fiber substrate partially coated with a fluorocarbon polymer as a working electrode in an electropolymerization process. If the solution contains aniline, polyaniline is deposited onto the substrate. On the other hand, if the solution contains pyrrole, polypyrrole is deposited. The electroconductive polymer will be preferentially deposited onto the uncovered portion of the substrate provide hydrophilic areas since electropolymerization predominately occurs on the electroconductive surface.

In various preferred embodiments, diffusion media of the invention are used in fuel cells. Exemplary fuel cells comprise an anode, a cathode, and a proton exchange membrane (PEM) disposed between the anode and the cathode. Impermeable electrically conductive members are provided adjacent the cathode and anode, and together with the respective electrodes define fluid distribution chambers associated with the cathode and anode, respectively. A diffusion medium such as described above is disposed in one or both of the fluid distribution chambers. In a preferred embodiment, the preferred distribution chamber has a gas entrance side and a gas exit side, and the diffusion medium spans the fluid distribution chamber from the entrance side to the exit side. On the anode side, the gas is the reactant hydrogen, while on the cathode the gas is the oxidizer oxygen. The balance of hydrophobic and hydrophilic areas (i.e., the amount and areal coverage of hydrophobic polymer, the amount and areal coverage of hydrophilic polymer, and the relative ratio of the two) of the diffusion medium may be varied as desired to provide water management in the fuel cell. For example, the amount of hydrophobic polymer may be different at portions of the respective diffusion media adjacent the entrance and exit sides of the fluid distribution chambers. In a non-limiting example where the diffusion medium is on the cathode side, the content of hydrophobic polymer is greater in an area of the diffusion medium adjacent the exit side than in an area of the diffusion medium adjacent the entrance side.

In one aspect of the invention, a matrix of hydrophobic and hydrophilic areas on a porous material such as a carbon fiber based diffusion medium is created by electropolymerization of a hydrophilic polymer onto a diffusion medium that has been partially coated with a nonconductive hydrophobic polymer. When an aqueous solution containing monomers for electropolymerization is applied to the partially coated diffusion medium, the deposition of electroconductive polymer will occur predominantly on areas of the substrate that are not covered with the hydrophobic polymer. This is believed to be in part due to the electrically nonconductive and hydrophobic nature of the coating, which prevents wetting of the carbon fibers with the solution containing the electropolymerizable monomers so that no electron can be transferred through the nonconductive polymer coating to initiate the electropolymerization process.

The hydrophobic polymer, which in various preferred embodiments comprises a fluorocarbon polymer, may be deposited on the porous material substrate by a variety of means as long at least a portion of the substrate remains uncovered. In one embodiment, a carbon fiber substrate is dipped into an emulsion of fluorocarbon polymers, removed from the emulsion, and laid on a solid substrate such as a glass slide. Upon evaporation of the solvent from the substrate, the fluorocarbon polymer deposited on the substrate will be concentrated on the side from which the solvent evaporated, while the opposite side will contain relatively less fluorocarbon polymer on its surface. The rate of evaporation of the solvent may be adjusted by, for example, varying the temperature in order to achieve a desired through plane distribution of deposited fluorocarbon across the substrate thickness. Alternatively, the in-plane distribution of the deposited fluorocarbon polymer may be varied. For example, the hydrophobic/hydrophilic balance of the diffusion medium in an area adjacent the inlet or entrance side for the reactant gases in the fuel cell may be different from that provided at the exit or outlet side.

The porous material or substrate for use in the invention is in general a porous 2-D flexible material that may be wetted by water or other solvents associated with solutions of polymers as described below. In one embodiment, the porous material (also called a sheet material) may be made of a woven or non-woven fabric. Such fabrics are made of fibers that are capable of being wetted by the polymer solutions. If necessary, a surfactant or wetting agent may be added to the polymer solution to enable the polymer and the solvent to wet on the fibers.

In a preferred embodiment, the sheet material is made of a carbon fiber paper. Carbon fiber papers may be thought of as a non-woven fabric made of carbon fibers. Carbon fiber paper is commercially available in a variety of forms. In various embodiments, for example, the density of the paper is from about 0.3 to 0.8 g/cm$^3$ or from about 0.4 to 0.6 g/cm$^3$, and the thickness of the paper is from about 100 µm to about 1000 µm, preferably from about 100 µm to about 500 µm, and the porosity is from about 60% to about 80%. Suitable carbon fiber papers for use in fuel cell applications as described below are available for example from Toray Industries USA. An example of commercially available carbon fiber paper from Toray is TGP H-060, which has a bulk density of 0.45 gm/cm$^3$ and is approximately 180 micron thick.

The hydrophobic polymer used in the invention and deposited on the sheet material by the methods of the invention is one that will settle out of an emulsion or precipitate out of a solution under the evaporating conditions described below. Preferably, the polymer deposited onto the sheet material is one that will remain stably in contact with the portions of the sheet during conditions of its use in the eventual end application, such as a diffusion medium in a fuel cell. As discussed below, the compatibility or stability of the polymer in contact with the sheet material may be enhanced by certain post-curing steps where the coated sheet material is heated to a high temperature to fix the structure of the polymer on the sheet material.

In a preferred embodiment, the polymer used is one that imparts a hydrophobic character to the substrate sheet material where the polymer is deposited. The polymer renders the surface of the substrate hydrophobic if the surface free energy of the polymer material is less than the surface free energy of the sheet material itself. Surface free energy of the polymer and the sheet material may be measured by and correlated to the contact angle of water in contact with the polymer or sheet material, respectively. For example, if the contact angle of water on the polymer is greater than the contact angle of water on the sheet material, then the polymer may be considered a hydrophobic material. If the contact angle of water on the polymer is less than the contact angle of water on the sheet material, the polymer may be considered as a hydrophilic polymer.

Non-limiting examples of hydrophobic polymers include fluororesins. Fluororesins are fluorine-containing polymers, made by polymerizing or copolymerizing one or more monomers that contain at least one fluorine atom. The terms "fluororesin" and "fluorocarbon polymer" are used interchangeably unless otherwise indicated. Non-limiting examples of fluorine-containing monomers that may be polymerized to yield fluorocarbon polymers include tetrafluoroethylene, hexafluoropropylene, vinylidene fluoride, perfluoromethyl vinyl ether, perfluoropropyl vinyl ether, and the like. The presence of fluorine carbon bonds is believed to be responsible for the hydrophobic nature of these polymers. A specific example of a preferred fluororesin is polytetrafluoroethylene (PTFE), a homopolymer of tetrafluoroethylene.

In various embodiments, a method for depositing a hydrophobic polymer on a sheet material in a pattern comprises wetting the sheet material with a polymer dispersion containing a solvent and the polymer. After the sheet material is dipped into the polymer dispersion, the sheet material is then contacted with a pattern member that contains openings corresponding to the pattern. Thereafter, the solvent is evaporated from the wet porous sheet material while the sheet material is still in contact with the pattern member. The solvent leaves the sheet through the pattern member at the openings. In this way, hydrophobic polymer is deposited onto the sheet, predominantly at the openings.

In a preferred embodiment, the fluororesin is deposited onto the carbon fiber paper in a pattern representing less than 100% coverage of the carbon fiber paper sheet by the fluororesin, for example, 50%-99% coverage. In other embodiments, polymer such as fluororesin may cover 10%-90% of the area of the sheet, preferably 10%-60% or 10%-50%. The method includes wetting the sheet of carbon fiber paper in an aqueous emulsion of fluororesin, followed by contacting the wet sheet with a pattern member before the solvent from the aqueous emulsion of fluororesin is completely evaporated. The pattern member comprises one or more openings oriented to correspond to the pattern of polymer coverage on the carbon fiber paper. The water is then evaporated from the carbon fiber paper sheet while the sheet is still in contact with the pattern member. As a result, the hydrophobic polymer is concentrated on the carbon fiber paper at locations corresponding to openings in the pattern member.

In various embodiments, the process of contacting the sheet with a pattern member while the sheet is still wet with solvent is accomplished by a process of hot pressing. For example, a sheet of carbon fiber paper is dipped into a fluororesin dispersion with an aqueous emulsion comprising water and fluororesin particles. While the carbon fiber paper sheet is still wet with water, the sheet is contacted with a pattern member by a process of hot pressing, and water is evaporated from the sheet while the sheet is in contact with the pattern member.

Sheet material such as carbon fiber paper having polymers such as fluororesins deposited on it in a pattern is useful for example as diffusion media in fuel cells. Such fuel cells contain an anode and a cathode with a proton exchange membrane disposed between the anode and the cathode. During operation of the fuel cell, water is produced at the surface of the cathode. The diffusion medium is disposed in contact to the anode and cathode catalyst layers in order to perform a variety of functions useful in water management and reactant gas transportation in the fuel cell.

The membrane is a proton exchange membrane (PEM), which typically comprises an ionic exchange component, such as a perfluorosulfonate ionomer membrane. One such commercially available membrane is the proton conductive membrane sold by E.I. DuPont De Nemours & Co. under the trade name NAFION®. The anode and cathode typically comprise porous materials with catalytic particles distributed therein, to facilitate the electrochemical reaction of oxygen with hydrogen. It is important to keep the membrane properly hydrated for proton transportation and to provide the proper internal resistance.

In various embodiments, the diffusion media of the invention are used on the anode side, the cathode side, or both. It will aid in water redistribution on the cathode side, and will also help humidify anode reactant gas by providing a reservoir to hold some water in the diffusion media. In addition, it will keep the membrane hydrated when used on either the anode or the cathode side.

During fuel cell operation, hydrogen gas is introduced at the anode, where the hydrogen ($H_2$) is split into two protons ($H^+$), freeing two electrons. The protons migrate across the membrane to the cathode side. Oxygen or air is introduced at the cathode side, where it is flows into the porous electrode. Catalyst particles within the cathode electrode facilitate a reaction between the protons ($H^+$) and oxygen ($O_2$), to form water within the electrode. Thus, as liquid water is generated, the gas flow into the porous cathode material must simultaneously be maintained. Otherwise the electrode has the potential to "flood" with liquid. Flooding impedes gas flow to the electrodes through the diffusion media, in effect decreasing or ceasing any reactions occurring at the MEA. A diffusion medium is provided in part to facilitate water management.

In various embodiments, the hydrophobic polymers are applied to the sheet material by wetting the sheet material in a wetting composition including the polymer and a solvent. In some embodiments, the wetting composition may be provided in the form of an emulsion. Solutions may also be used. In some embodiments, the wetting compositions contain surface active materials or other agents to hold the polymer in solution or suspension, or to aid in wetting the sheet material. For example, an emulsion used to wet the sheet material may include from 1 to about 70 wt. % particles of a hydrophobic polymer such as polytetrafluoroethylene. In other embodiments, ranges of 1%-20% are preferred. In a preferred embodiment, the polymer composition contains approximately 2% to 15% of the polymer solids by weight. As noted above, the polymer composition may contain surface active agents or wetting agents in addition to solvents such as water and polymer particles such as polytetrafluoroethylene particles.

Wetting of the sheet material may be accomplished by exposing the sheet material to the wetting composition for a time and at a polymer concentration selected so as to deposit a desired amount of hydrophobic polymer onto the sheet. For example, the sheet material may be dipped, immersed, or soaked in the wetting solution. Preferably, from about 1% to about 20% by weight polymer is deposited onto the sheet material based on the total weight of the polymer and sheet material, more preferably, about 2% to 15%, and more preferably, about 4% to 10%. The amount and pattern of polymer coverage may be varied according to how relatively hydrophobic or hydrophilic the sheet material is, the hydrophobic nature of the deposited polymer, and the desired percentage coverage of the sheet material with deposited polymer, all taken in view of the requirements of the end application. In a non-limiting example, a carbon fiber paper containing about 7% by weight deposited polymer such as PTFE or other fluororesin has been found satisfactory for use in a fuel cell.

The pattern member is so called because it is made of a relatively rigid framework material having openings defining a pattern in which the hydrophobic polymer will be deposited on the sheet material. The openings in the pattern member may be provided in the form of holes, perforations, slots, or other shapes, and may be produced in the pattern member by any suitable punching, cutting, or other process. In other embodiments, the pattern member may be provided in the form of a screen having a pattern of holes or openings in one or two dimensions. A pattern member in the form of a screen may take the shape of a perforated plate or a meshed wire fabric. Non-limiting examples include perforated sheet iron and perforated stainless steel screens. In various embodiments, the openings make up 10%-90% of the area of the screen to be put into contact with the sheet. In other embodiments, the openings may make up 10%-60% or preferably 10%-50% of the screen contact area. In another embodiment, the pattern member may be provided in the form of a plate or an essentially planar member. The pattern member may be planar or it may be slightly curved. In any case, the pattern member is adapted to be pressed against the sheet material during a subsequent evaporative step described below.

In another embodiment, the pattern member may be cylindrical. In this embodiment, the cylindrical pattern member may be adapted to produce a pattern of coating on a sheet material by a process of hot rolling. In this embodiment, a portion of the cylindrical pattern material is first pressed against a sheet material. High temperature or other conditions are applied to evaporate solvent from the sheet material while the sheet material is in contact with the cylinder. The cylinder is rolled across the sheet at a rate slow enough that evaporation happens while the cylindrical pattern member is momentarily in contact with the sheet material. A wetted sheet material may be continuously fed into an apparatus containing such a rolling cylindrical pattern member.

Preferably, the material from which the framework material of the pattern member is constructed is impervious to water or other solvents, and should preferably be heat conductive to promote evaporation of the solvent discussed below. When in contact with the sheet material, the openings in the pattern member define evaporation pathways for solvent to escape from the porous sheet material held in contact with the pattern member.

When the sheet material is still wet, an evaporation step is carried out by contacting the pattern member with the sheet material and applying evaporating conditions. In a preferred embodiment, the sheet material is heated while in contact with the pattern member. In other embodiments, a vacuum may be pulled to evaporate the solvent, or air or other gas may be blown across the surface of the sheet material while in contact with pattern member to facilitate evaporation. Drying can also be accomplished by using microwave or infrared radiation to heat the material and evaporate the solvent. Combinations of such evaporating conditions may also be employed.

When the sheet material is heated to evaporate the solvent, the speed of evaporation is a function of several variables, such as the temperature, environmental relative humidity and convective flow rate. This rate of drying in turn affects the through-plane distribution of the hydrophobic polymer. For example, faster drying will tend to pull PTFE to the paper surface at the openings, while a slower dry will tend to result in relatively more PTFE being deposited in the paper cross section or bulk. By choosing a suitable combination of conditions such as temperature, vacuum, and streams of gas, it is possible to select conditions where the solvent evaporates at an acceptable rate and thus to generate the desired cross-sectional PTFE distribution.

In one embodiment, the pattern member is contacted with the sheet material in a mold that may or may not contain openings—some embodiments are illustrated in the figures. In another preferred embodiment, the pattern member may be contacted with a sheet material by a process of hot pressing. In such a process, the pattern member is preferably heated before coming into contact with the sheet member. The hot pressing member may be in the form of a plate, a curved material or a cylinder such as described above. The hot pressing technique is especially suitable for adaptation to continuous or high throughput processes.

During the drying or evaporation step, the polymer particles such as PTFE particles move with the solvent and settle down at the place where the solvent evaporates from the substrate. The pattern member is prepared in such a way that an open hole or slot is cut where a relatively high content of deposited hydrophobic polymer is desired or contemplated on the sheet material. The sheet material may be dipped or otherwise exposed to the polymer solution and the wet sheet material such as carbon fiber paper may be placed between two identical and mirror image pattern molds. Alternatively, the sheet material may be contacted by a mold or pattern member having a different pattern design on either side of the sheet material. In yet another alternative, one side of the sheet material may be put in contact with a pattern member and the other side exposed to a closed block. These and other embodiments are further illustrated in non-limiting examples by way of the figures.

In this way, PTFE particles or other polymer particles are deposited onto the sheet material most heavily at the places where the solvent evaporates from the sheet material. The deposition locations correspond to the openings in the pattern member. Locations on the sheet material in contact with the solid portions of the pattern member (i.e., not the openings) may have a detectable amount of polymer deposition, but it will be less than at the openings.

After the solvent has been evaporated and the hydrophobic polymer deposited on the sheet material in a desired pattern, it is usually desirable to carry out a further post-curing or sintering step. This post-curing is generally accomplished by heating to a relatively high temperature for a time sufficient to accomplish the curing. In the case of fluororesin coatings such as polytetrafluoroethylene, it generally suffices to heat to a temperature of about 380° C. In general, it is preferred to heat any such polymer coating around its melting or softening temperature. The softening allows more intimate contact of the polymer with the fabric of the sheet material. The patterns deposited on the fabric during the drying step are not changed by the high temperature curing. Thus the pattern formation step may be carried out at a relatively low temperature, providing a low cost method.

FIG. 1A shows a pattern member 2 made of a solid portion or impermeable part 6 defining openings 8 in the pattern member 2, here illustrated as a series of slots 8. FIG. 1B shows a cross-section of pattern member 2 showing the solid portion 6 and the opening 8. FIG. 1C illustrates a sheet material 4 made by contacting the pattern member 2 with a porous fabric according to the method of the invention. The sheet 4 contains areas 10 that correspond to locations held adjacent openings 8 in the pattern member, and contact areas 12 correspond to locations held adjacent to solid portions 6 of the pattern member. Polymer is deposited onto the sheet primarily at the open areas 8.

FIG. 2A shows a perspective drawing of another embodiment of a pattern member 2, here illustrated as a solid portion 6 in the form of a screen having openings 8 in the form of holes in a two dimensional pattern in the pattern member. FIG. 2B shows a porous fabric 4 having polymer primarily deposited on open areas 10 whereas little or no polymer is deposited on contact areas 12.

Figure 3B:
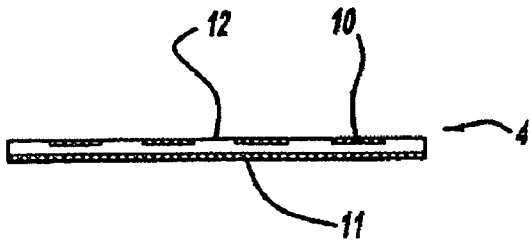

FIG. 3A shows a cross-section of a pattern member 2 in contact with a porous fabric 4. Pattern member 2 is made of solid portion 6 having openings 8 defining evaporation paths for the solvent in the porous fabric 4. The porous fabric 4 contacts the pattern member at contact areas 12, leaving open areas 10 of the porous fabric not in contact with the pattern member. In the embodiment illustrated in FIG. 3A, the opposite side 11 of the porous fabric 4 is not in contact with the pattern member during the evaporation step. FIG. 3B illustrates in schematic form the structure of a porous fabric of 3A after the evaporation step. FIG. 3B shows the polymer deposited onto the porous fabric 4 predominantly at locations corresponding to open areas 10 and opposite side 11 of the porous fabric of FIG. 3A. On the other hand, at locations 12 on the porous fabric corresponding to where the porous fabric was in contact with the pattern member during evaporation, little or no polymer is deposited.

Figure 4A:
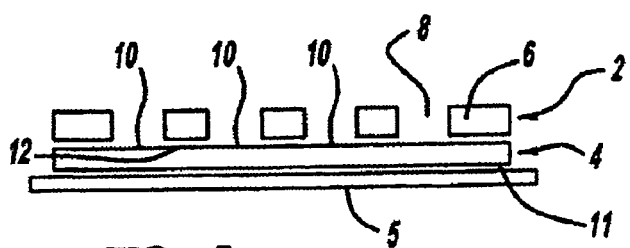
Figure 4B:
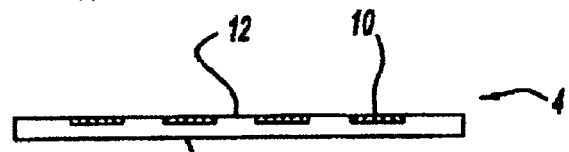

FIG. 4A shows a porous fabric of the invention in contact with a pattern member 2 on one side and a solid mold surface 5 on the other. FIG. 4B shows the pattern of polymer deposition on the porous fabric of 4A after the evaporation step. The side in contact with the pattern member shows polymer deposits at locations 10 whereas no polymer is deposited at locations 12. Also, the opposite side 11 of the porous fabric contains little or no deposited polymer, as it was in contact with a mold surface during the evaporation step and there were consequently no evaporation paths provided from the opposite side.

Figure 5A:
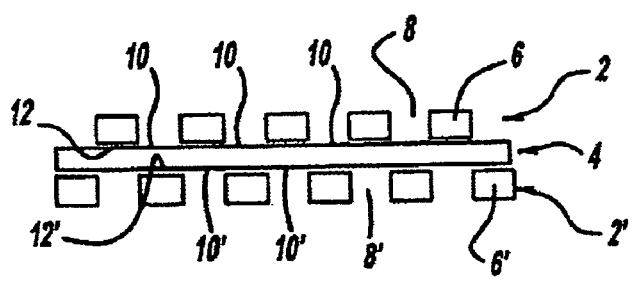
Figure 5B:
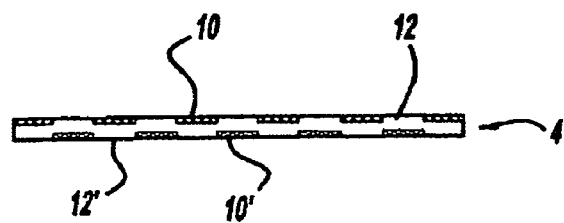

FIG. 5A illustrates in schematic form a porous fabric 4 in contact with a pattern member 2 on one side and a pattern member 2' on the other. The pattern member 2' on the opposite side of the porous fabric is made of solid portion 6' and openings in the pattern member 8'. The porous fabric 4 is in contact with the pattern member during the evaporation step at locations 12 and 12', while locations 10 and 10' of respective pattern members 2 and 2' are not in contact during the evaporation step. FIG. 5B illustrates the porous fabric having deposited polymer such as produced in FIG. 5A by evaporation. Polymer is deposited on the porous fabric 4 at locations 10 and 10' corresponding to the open areas of FIG. 5A. Furthermore, there is little or no polymer deposited at locations 12 and 12' corresponding to the contact area between the fabric and the pattern member during the evaporation step.

Once the hydrophobic polymer is deposited on the sheet material such as a carbon fiber based substrate, a hydrophilic polymer is deposited onto the substrate. In various embodiments, the hydrophilic polymer is deposited predominantly on areas of the substrate that are not covered by the hydrophobic polymer.

In various embodiments, the hydrophilic polymer is made by a process of electrochemical polymerization. A carbon fiber paper partially coated with fluorocarbon polymer as described above is used as the working electrode of an electrochemical cell. All references to carbon fiber in the description of the electrochemical polymerization below are to be understood as referring to the carbon fiber substrate partially coated with fluorocarbon polymer discussed above. The carbon fiber paper anode is immersed in a solution of monomers and electrolyte. A positive potential is applied to the working electrode, and the conductive polymer is formed by anode coupling of monomer radical cations (for example, pyrrole radical cations to form polypyrrole at the 2,5 position). The formation of the conductive polymer and surface properties of the coating are dependent on the monomer concentration, electrolyte concentration, and the reaction conditions.

Suitable monomers include those known to form electroconductive polymers upon polymerization at an anode having a voltage above the oxidation potential of the monomer. Non-limiting examples of such monomers include pyrrole, thiophene, aniline, furan, azulene, carbazole, as well as substituted derivatives of these. Substituted derivatives include 1-methylpyrrole, and various β-substituted pyrroles, thiophenes, and furans. Non-limiting examples of β-substituted thiophenes include, for example, β-alkyl thiophene, β-bromo thiophene, β-$CH_2CN$ thiophene, and β,β'-dibromothiophene. Similar substitutions may be provided on a furan or pyrrole ring. Furthermore, various alkyl, halo, and other substituted azulenes and carbazoles may be used. As noted above, the carbon fiber paper is set up as the working electrode, or anode, during the electropolymerization. Suitable counter-electrodes are also provided, for example, graphite block or stainless steel screen. A standard calomel reference electrode (SCE) may be placed close to the working electrode. The carbon fiber paper may be electrically coupled to a current collector such as a metal foil, or may be connected directly into the circuit by suitable clips, leads, or other devices. Two chambers separated with a semi-permeable membrane or a single chamber can be used for counter-electrode and working electrode respectively. The counter-electrodes and the working electrodes are generally immersed in the same electrolyte. The compartment in which the working electrode is held further contains a suitable concentration of polymerizable monomers.

In general, the concentration of the polymerizable monomers may be chosen over a wide range depending on the conditions of polymerization. It is to be understood that the rate of polymerization and the extent of incorporation of the polymer onto the carbon fiber surface will be determined in part by the concentration of the monomer. Suitable monomeric concentrations include concentrations between about 0.01M and the upper solubility limit of the monomer. In various embodiments, a maximum concentration of about 1.5 M of the polymerizable monomer is used. In various other embodiments, the monomer concentration is at least about 0.1 M, at least about 0.5 M, or is in the range of about 0.5 M to about 1.5 M.

The electropolymerization compartments also contain a suitable level of electrolyte. A wide variety of electrolytes may be used, and the concentration of the electrolyte is chosen depending on the other characteristics of the electrochemical cell and the other reaction conditions. Preferably, the electrolyte concentration is chosen so that charge transfer through the cell by means of the electrolyte molecules is not rate limiting. As with the monomers, the concentration of the electrolyte may range from about 0.01 M up to its solubility limit in the solvent. Preferably electrolytes are used in a range between about 0.01 M and about 1.5 M, preferably from about 0.1 M to about 1.0 M. A preferred solvent is water.

The electrolyte may be chosen from molecules or mixtures of molecules that contain a molecular charge and can carry electrons through the solution between the electrodes. Commonly used electrolytes include sulfonic acids and sulfonates such as, without limitation, camphor sulfonic acid, para-toluene sulfonic acid, dodecyl benzene sulfonic acid, sulfuric acid, alizarin red S-monohydrate, and their salts, especially the sodium salts. The electrolyte is normally incorporated into the deposited electroconductive polymer coating. The structure and concentration of the electrolyte will affect the surface free energy of the coated carbon fibers.

The electroconductive polymer is deposited onto the anode carbon fiber paper by passing current through the polymerization compartment for a time to oxidize a sufficient amount of monomer to react to form the electroconductive polymer on the carbon fiber surface. The reaction time for deposition of the polymer will depend on many factors, such as the temperature of the cell, the concentration of monomer and electrolyte, applied potential, the configuration of the cell, and the desired extent of incorporation of polymer onto the carbon fiber paper. Typical reaction times range from a few seconds to a few minutes. By varying the parameters just as discussed, coated carbon fiber papers having a surface free energy from just above that of uncoated carbon fibers to more than 70 dyne/cm may be prepared.

Electropolymerization is carried out with the anode held at voltage above the oxidation potential of the polymerizable monomer. Above that voltage, an applied voltage may be chosen consistent with the reaction time, desired surface free energy, monomer concentration, electrolyte concentration, reaction temperature and other parameters. As a practical matter, the applied voltage should be less than the voltage that would hydrolyze the water in the electrochemical cell. In various embodiments, the applied voltage is in the range from about 0.5 to about 2.5 volts. Various counter electrodes may be used, such as platinum mesh, titanium mesh, and graphite blocks.

In a preferred embodiment, the electropolymerization is carried out by using a pulse deposition technique. For example, when a potentiostat is set to deliver a pulse voltage (square wave function at a certain frequency), the polymerization process tends to occur predominantly on the exposed carbon fiber region instead of in solution. Formation of polymer in solution can lead to undesirable deposition of polymer onto regions initially covered with non-conductive hydrophobic polymers. During the cycle when the voltage is applied, the monomer is oxidized at the surface of the anode and polymerizes on the surface. At the same time, the volume of electrolyte around the substrate surface is temporarily depleted of monomer. When the voltage cycle is off, reaction stops, and the concentration of monomer can become re-established at the surface of the anode by diffusion from the bulk of the anode cell electrolyte. When the voltage is again turned on, the monomer is oxidized at the anode surface and polymerized as before. The duration of the voltage or current pulses may be chosen to optimize the rate and uniformity of the formation of the electroconductive polymers on the surface. For example, the frequency of pulses may be selected from about 0.1 Hz to about 0.001 Hz. The percent on/off time during a cycle may also vary. In a typical embodiment, the on/off cycle time is 50/50.

In a process for making the coated carbon fiber paper of the invention, preferred monomers for the electropolymerization include pyrrole and aniline. Polypyrrole or polyaniline is deposited onto the surface of the carbon fibers in the carbon fiber paper. Generally, the process causes a small amount of electrolyte to be incorporated into the electrodeposited conductive polymer, which can be used to tailor the conductivity and surface free energy of the polymer coating The surface free energy and other useful physical characteristics of the coated carbon fiber paper depend on a variety of factors, such as the nature of counter ions (electrolyte) incorporated into the polymer, the amount of polymer, and surface morphology of the polymer that is electropolymerized onto the surface. In various embodiments, a wicking material comprises a carbon fiber paper coated with from about 2% to about 30% by weight of an electroconductive polymer, or from about 2% to about 15% by weight. In a preferred embodiment, the thickness of the polymer coating is about 5% to about 10% of the diameter of the carbon fibers.

In various embodiments, the diffusion medium containing hydrophobic and hydrophilic deposited polymers described above is used in an electrochemical fuel cell to provide integrated water management. Such water management functions include: moving water away from the wet areas of the fuel cell, where it is generated as a product in the fuel cell electrochemical reaction; transporting water internally to any relatively dry areas; acting as a water reservoir for storing and releasing water during wet and dry operating conditions; and humidifying the proton exchange membrane (PEM) of the membrane electrode assembly (MEA).

Figure 6:
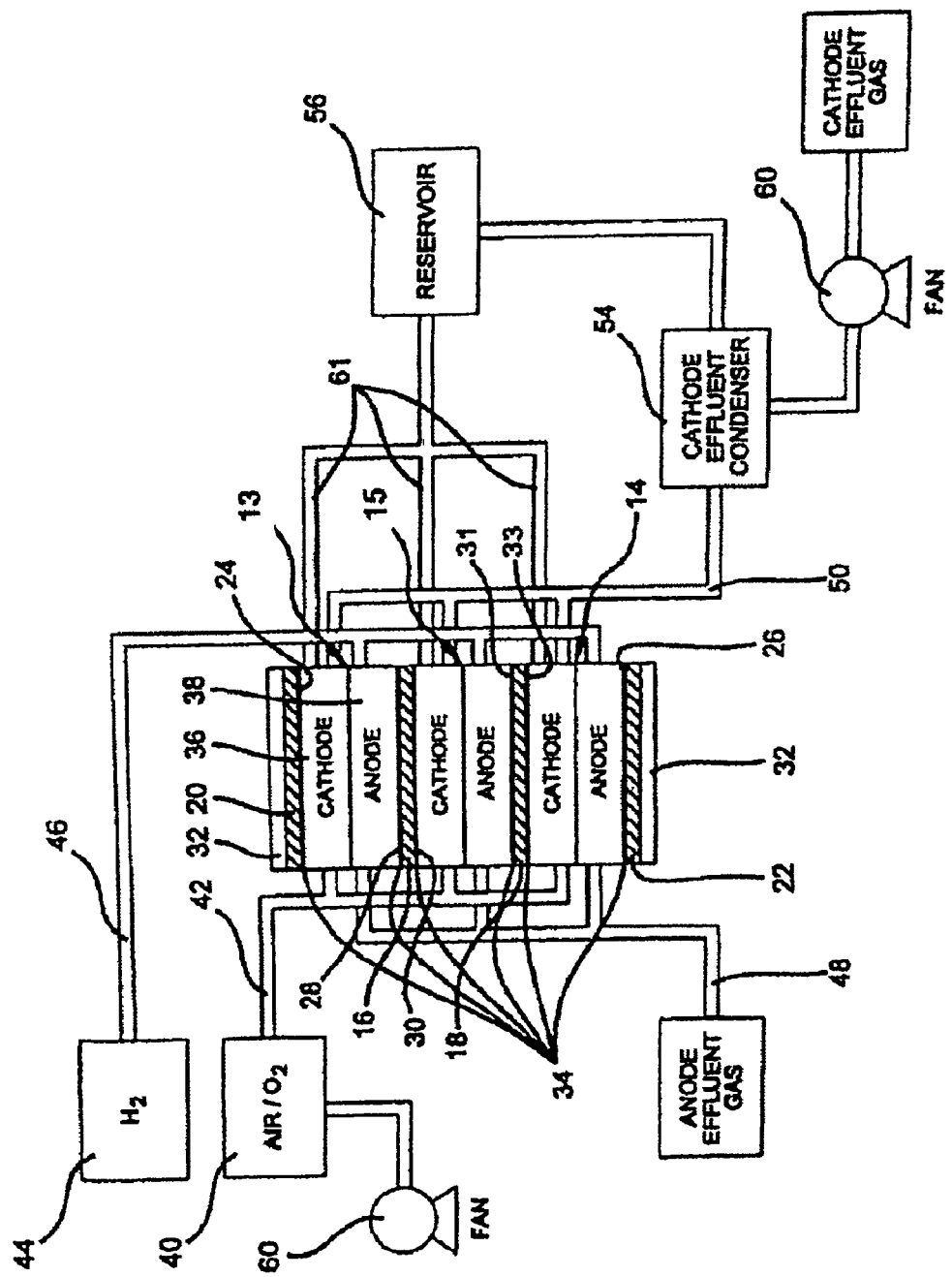
FIG. 6 is a schematic illustration of three cells in a stack in an exemplary fuel cell system.

Referring generally to FIG. 6, three individual proton exchange membrane (PEM) fuel cells according to one preferred embodiment of the present invention are connected to form a stack. Each PEM fuel cell has membrane-electrode-assemblies (MEA) 13,15,14, respectively, separated from one another by electrically conductive, impermeable separator plates 16,18, and further sandwiched between terminal separator plates 20,22 at each end of the stack with each terminal plate 20,22 having only one electrically active side 24,26. An individual fuel cell, which is not connected in series within a stack, has a separator plate, with only a single electrically active side. In a multiple fuel cell stack, such as the one shown, a preferred bipolar separator plate 16 typically has two electrically active sides 28,30 respectively facing a separate MEA 13,15 with opposite charges that are separated, hence the so-called "bipolar" plate. As described herein, the fuel cell stack has conductive bipolar separator plates in a stack with multiple fuel cells, however the present invention is equally applicable to conductive separator plates within a stack having only a single fuel cell.

In the embodiments shown, the MEAs 13,15,14 and bipolar plates 16,18 are stacked together between aluminum clamping plates 32 at each end of the stack and the end contact terminal plate elements 20,22. The end contact terminal plate elements 20,22, as well as working faces 28,30 and 31,33 of both bipolar separator plates 16,18, contain a plurality of gas flow channels (not shown) for distributing fuel and oxidant gases (i.e., $H_2$ & $O_2$) to the MEAs 13,15,14. Nonconductive gaskets or seals (not shown) provide seals and electrical insulation between the several components of the fuel cell stack. Gas-permeable conductive diffusion media 34 press up against the electrode faces of the MEAs 13,15,14. When the fuel cell stack is assembled, the conductive gas diffusion layers 34 assist in even distribution of gas across the electrodes of the MEAs 13,15,14 and also assist in conducting electrical current throughout the stack.

Oxygen is supplied to the cathode side 36 of each fuel cell in the stack from storage tank 40 via appropriate supply plumbing 42, while hydrogen is supplied to the anode side 38 of the fuel cell from storage tank 44, via appropriate supply plumbing 46. Alternatively, air may be supplied to the cathode side 36 from the ambient, and hydrogen to the anode 38 from a methanol or gasoline reformer, or the like. Exhaust plumbing for the anode side 48 and the cathode side 50 of the MEAs 13,15,14 are provided. On the cathode side, the plumbing defines an exit side. Gas flow into and out of the stack is typically facilitated by fans 60, such as those shown in the exemplary configuration of FIG. 6. The configuration and number of fans shown is merely exemplary and not limiting.

If external humidification is desired, it may be provided as shown, in a non-limiting embodiment, in FIG. 6. As shown in the embodiment of FIG. 6, the cathode effluent 50 is routed from the stack to a condenser 54, which serves to liquefy and recover the vapors in the cathode effluent stream 50. The liquids (e.g. water) are transported to a reservoir 56 for storage. The effluent stream 50 from the cathode has a high concentration of vapor (water vapor, for example) due to the water generated by the electrochemical reactions occurring within the MEA and any additional water introduced for cooling. The water evaporates due to pressure and temperature conditions within the fuel cell. Preferably, the effluent stream is saturated with vapor (e.g. in the case of water at approximately 100% relative humidity). As shown, the supply conduits 61 provide water to the cathode side of each MEA 13,15,14 by interconnecting the reservoir 56 to the fuel cells in the stack. A pump (not shown) may optionally be included in the system to facilitate the transport of the liquid from the reservoir 56 to the stack, or through other areas of the system.

The impermeable electrically conductive layer 80 comprises a solid conductive body 86. The impermeable electrically conductive layer 80 is impervious to both fluid and gas flow, thus providing a physical barrier between the several fuel cells, or the terminal end of the stack. The impermeable electrically conductive layer 80 may be constructed of conductive materials known in the art, such as for example, aluminum, titanium, stainless steels, and their alloys, as well as carbon composites. Preferably, the conductive impermeable layer 80 is adjacent and attached to the fluid distribution means 72.

The invention has been described above with respect to certain embodiments. Further non-limiting description of the invention are given in the Examples that follow.

EXAMPLES

Example 1

A pattern member in the form of a screen is provided having a series of holes in a stainless steel sheet such that the area of the holes makes up about 20 to 63% of the total surface area of the pattern member. Such screens are commercially available, for example from McMaster-Carr. A sheet of carbon fiber paper (for example Toray TGP H-060, Toray, Japan with a thickness of about 180 μm, fiber diameter of 7 μm, and 75% porosity) is soaked in a 3 wt % dispersion of polytetrafluoroethylene (PTFE) for 4 minutes. The 3 wt % PTFE solution is prepared by a 20:1 dilution of a 60 wt % DuPont T-30 PTFE dispersion. The carbon fiber paper is then placed in contact with the pattern member and dried at 120° C. for 0.5 hours. At this point, there is approximately an 8 wt % uptake, which is generally made of PTFE and surfactants in the commercial solution. After solvent removal, the paper is removed from contact with the pattern member and cured at 380° C. for 20 minutes. After the curing step, there remains approximately a 7 wt % uptake of PTFE.

Example 2

Polyaniline is deposited on the PTFE coated paper of Example 1 in polystyrene sulfonic acid electrolyte. A plating bath contains 1.3 M aniline and 0.2 mg/ml polystyrene sulfonic acid in water. A piece of 3"×3" Toray 060 carbon paper, prepared as in Example 1, is placed in the middle of the plating bath as working electrode. Two pieces of stainless steel counter electrodes are placed on each side of the carbon fiber paper, which are about 1.5" apart from the carbon paper surface. An SCE electrode is placed near the carbon paper surface as reference electrode.

The electropolymerization process is performed with a Potentiostat using the following method: a square wave of applied voltage between 0.9 V and 0 V at 0.1 Hz, 50/50 duration is applied to electropolymerize aniline (The voltage is applied at 0.9V for 5 seconds and subsequently at 0V for 5 seconds). The total reaction time is 50 seconds (25 seconds at 0.9V). Visual inspection of the paper indicates polyaniline is preferentially deposited on the regions initially uncovered with PTFE.

The loading of the conductive polymer can be estimated by the charge passed through the deposition cell after calibrating deposition efficiency (pass a known amount of current or charge through the system and then rinse and dry the sample to measure the weight gain).

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A fuel cell comprising:
an anode;
a cathode;
a proton exchange membrane disposed between the anode and the cathode;
a fluid distribution chamber associated with the cathode having a gas entrance and a gas exit side;
a fluid distribution chamber associated with the anode having a gas entrance and a gas exit side;
a diffusion medium disposed within the fluid distribution chamber associated with the cathode, the fluid distribution chamber associated with the anode, or both, wherein the diffusion medium spans the fluid distribution chamber from the entrance side to the exit side, and wherein at least one of the diffusion media comprises:
an electrically conductive porous material;
a hydrophobic polymer deposited on the porous material defining hydrophobic areas; and
a hydrophilic polymer deposited on the porous material defining hydrophilic areas.

2. A fuel cell according to claim 1, wherein the hydrophobic polymer comprises a fluorocarbon polymer.

3. A fuel cell according to claim 2, wherein the hydrophobic polymer comprises polytetrafluoroethylene.

4. A fuel cell according to claim 1, wherein the hydrophilic polymer comprises polyaniline.

5. A fuel cell according to claim 1, wherein the hydrophilic polymer comprises polypyrrole.

6. A fuel cell according to claim 1, wherein at least one of the diffusion media comprising hydrophobic polymer and hydrophilic polymer has a different content of hydrophobic polymer in an area of the diffusion medium adjacent the entrance side than in an area of the diffusion medium adjacent the exit side.

7. A fuel cell according to claim 6, wherein a diffusion medium disposed adjacent the cathode has a higher content of hydrophobic polymer in an area of the diffusion medium adjacent the exit side than in an area adjacent the entrance side.

8. A fuel cell according to claim 1, wherein the porous material comprises carbon fiber paper.

9. A diffusion medium for use in a PEM fuel cell containing hydrophobic and hydrophilic areas for improved water management comprising:
a porous conductive substrate having two sides
a hydrophobic polymer deposited on the substrate defining the hydrophobic areas; and
an electroconductive polymer deposited on the substrate defining the hydrophilic areas.

10. A diffusion medium according to claim 9, wherein the hydrophobic polymer comprises a fluorocarbon polymer.

11. A diffusion medium according to claim 10, wherein the hydrophobic polymer comprises polytetrafluoroethylene.

12. A diffusion medium according to claim 9, wherein the electroconductive polymer comprises polyaniline or polypyrrole.

13. A diffusion medium according to claim 9, wherein the hydrophobic areas are predominantly on one side of the substrate and the hydrophilic areas are predominantly on the other side.

14. A diffusion medium according to claim 9, wherein the substrate comprises a carbon fiber paper.

15. A diffusion medium according to claim 14, wherein the hydrophobic polymer comprises a fluorocarbon polymer.

* * * * *